(12) United States Patent
Kn et al.

(10) Patent No.: US 7,840,732 B2
(45) Date of Patent: Nov. 23, 2010

(54) STACKED CARD ADDRESS ASSIGNMENT

(75) Inventors: Dinesh Kumar Kn, Karnataka (IN);
Narasimha Murthy S, Bangalore Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 554 days.

(21) Appl. No.: 11/526,459

(22) Filed: Sep. 25, 2006

(65) Prior Publication Data
US 2008/0077718 A1 Mar. 27, 2008

(51) Int. Cl.
G06F 13/42 (2006.01)
G06F 15/16 (2006.01)
H04L 12/28 (2006.01)
H04L 12/56 (2006.01)
H01L 23/02 (2006.01)
H01R 12/16 (2006.01)

(52) U.S. Cl. .................. 710/104; 370/255; 370/390; 257/686; 361/790; 709/245

(58) Field of Classification Search .............. 710/104; 709/245; 370/255, 390; 257/686; 361/790
See application file for complete search history.

(56) References Cited

U.S. PATENT DOCUMENTS

| | | | | |
|---|---|---|---|---|
| 4,773,868 A | * | 9/1988 | Heinecke | 439/69 |
| 5,201,038 A | * | 4/1993 | Fielder | 710/100 |
| 5,437,019 A | * | 7/1995 | Brockmann | 711/5 |
| 5,530,887 A | * | 6/1996 | Harper et al. | 710/104 |
| 5,564,055 A | * | 10/1996 | Asnaashari et al. | 713/1 |
| 5,604,871 A | * | 2/1997 | Pecone | 710/301 |
| 5,948,078 A | * | 9/1999 | Joffe | 710/9 |
| 5,963,464 A | * | 10/1999 | Dell et al. | 365/52 |
| 6,496,940 B1 | | 12/2002 | Horst et al. | |
| 6,502,161 B1 | * | 12/2002 | Perego et al. | 711/5 |
| 6,567,870 B1 | * | 5/2003 | Thomas et al. | 710/62 |
| 6,650,332 B2 | * | 11/2003 | Doyle et al. | 345/532 |
| 6,683,372 B1 | * | 1/2004 | Wong et al. | 257/686 |
| 6,799,234 B1 | * | 9/2004 | Moon et al. | 710/110 |
| 6,839,393 B1 | | 1/2005 | Sidiropoulos | |
| 6,864,569 B2 | * | 3/2005 | Evans | 257/686 |
| 6,882,649 B1 | | 4/2005 | Gura et al. | |
| 6,963,941 B1 | | 11/2005 | Lee | |
| 7,000,052 B2 | * | 2/2006 | Moon et al. | 710/300 |

(Continued)

FOREIGN PATENT DOCUMENTS

EP 849684 6/1998

(Continued)

Primary Examiner—Mark Rinehart
Assistant Examiner—Christopher A Daley
(74) Attorney, Agent, or Firm—Schwegman, Lundberg & Woessner, P.A.

(57) ABSTRACT

Stacking of electronics modules, boards or cards, hereinafter referred to as cards is described. Each card in a stack is connected logically to a host via a single physical bus slot, and can detect its relative position in the stack on initial power on and make use of that information to grab an appropriate resource pool. In one embodiment, a top most card is used as a reference and the rest of the cards in the stack derive a relative address with respect to the top most card. A few lines are dedicated between neighboring cards through which the cards can share their relative address information with succeeding cards and automate resource allocation based on the address information.

29 Claims, 3 Drawing Sheets

U.S. PATENT DOCUMENTS

| | | | |
|---|---|---|---|
| 7,215,561 B2* | 5/2007 | Park et al. ............... 365/52 |
| 7,269,042 B2* | 9/2007 | Kinsley et al. ............... 365/52 |
| 7,286,384 B2* | 10/2007 | Wendt et al. ............... 365/63 |
| 7,298,668 B2* | 11/2007 | Hoppe et al. ............... 365/233.1 |
| 7,337,256 B2* | 2/2008 | Korowitz et al. ............... 710/301 |
| 7,493,439 B2* | 2/2009 | Gower et al. ............... 710/305 |
| 7,606,959 B2* | 10/2009 | Yao et al. ............... 710/301 |
| 2002/0034068 A1* | 3/2002 | Weber et al. ............... 361/790 |
| 2002/0129186 A1* | 9/2002 | Emerson et al. ............... 710/302 |
| 2003/0049948 A1 | 3/2003 | Kim et al. |
| 2004/0255178 A1* | 12/2004 | Hung ............... 714/1 |
| 2005/0160216 A1 | 7/2005 | Norman et al. |
| 2005/0172085 A1 | 8/2005 | Klingman |
| 2005/0177671 A1 | 8/2005 | Klingman |
| 2005/0228931 A1 | 10/2005 | Broyles |
| 2005/0268070 A1 | 12/2005 | Baxter |
| 2005/0271072 A1 | 12/2005 | Anderson et al. |
| 2005/0283743 A1 | 12/2005 | Mulholland et al. |
| 2006/0288132 A1* | 12/2006 | McCall et al. ............... 710/31 |

FOREIGN PATENT DOCUMENTS

| | | |
|---|---|---|
| EP | 1187033 | 3/2002 |
| EP | 918556 | 1/2005 |
| WO | WO-0115499 | 3/2001 |
| WO | WO-2005069151 | 7/2005 |

\* cited by examiner

STACKED CARD ADDRESS ASSIGNMENT

BACKGROUND

Industry accepted computer processing standards use the concept of virtual slots, wherein multiple modules, cards or boards are interconnected. Virtual slot techniques permit the use of self stacking modules, cards or boards over a processor bus to allow multiple cards on a system without the burden of backplanes. The processor is logically connected to the stacked cards through the bus, and a connection to the bus is shared by the stacked cards.

Processor resources, such as chip select signals, interrupts, common clocks, etc., are allocated across the stacked cards. Manual settings may be used to associate the cards to the resources. This allows similar or even dissimilar hardware units to be cascaded or stacked with different jumper/switch settings or loaded with configured software, so that resources may be distributed without clash. Such jumper/switch settings, software or other manual settings may require system knowledge to set or configure properly. Lack of such knowledge, or mistakes in making the settings can lead to performance and resource clash issues. Some system flexibility, such as the order cards are stacked, may also be sacrificed with this conventional approach.

DETAILED DESCRIPTION

Figure 1:
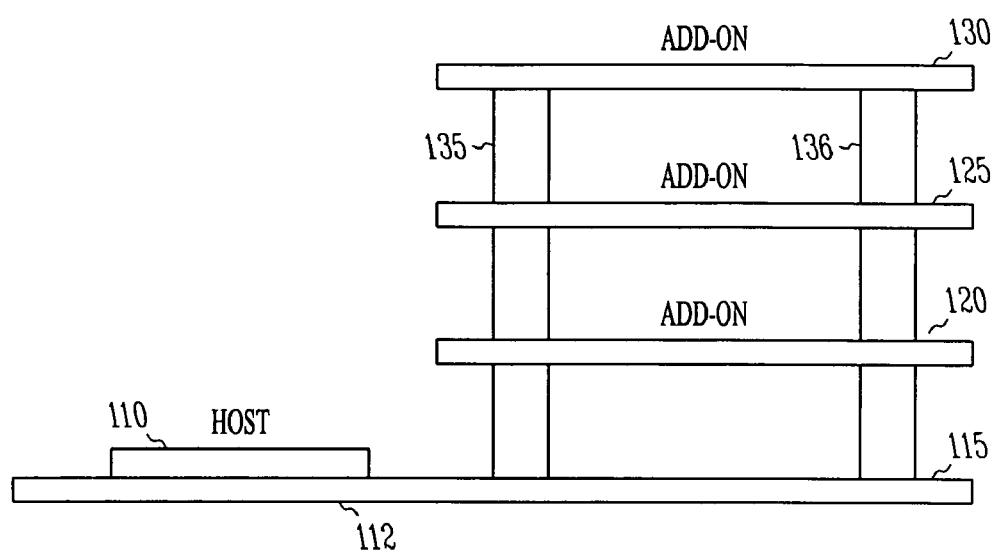
FIG. 1 is a block diagram of a system having cascaded cards according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein are implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wireless transmissions. Further, such functions correspond to modules, which are software, hardware, firmware or any combination thereof. Multiple functions are performed in one or more modules as desired, and the embodiments described are merely examples. The software may be executed on a digital signal processor, ASIC, microprocessor, or other type of processor operating on a computer system, such as a personal computer, server or other computer system.

Stacking of electronics modules, boards or cards, hereinafter referred to as cards is described. In one embodiment, a baseboard has electronic communication with a plurality of daughterboards. The daughterboards may be of the same type (homogeneous) or different types (heterogeneous). The electronic communication is channeled through a route running across the daughterboards.

In a further embodiment, each card in a stack is connected logically and can detect its relative position in the stack on initial power on. Relative address information is available through out operation and can be used dynamically if desired. The relative address information may be used to obtain or associate an appropriate resource pool. In one embodiment, a card, such as a bottom most or top most card is used as a reference and the rest of the cards in the stack derive a relative address with respect to such reference card. A few lines are dedicated between neighboring cards through which the cards can share their relative address information with succeeding cards and automate resource allocation based on the address information.

In one embodiment, the addresses generated are card level addresses, which are then used to enable resource allocation to the cards. In further embodiments, the card level addresses may be used for resource negotiation as well, depending on the complexity of the system. Stacked, or cascaded cards are then self aware of their position in a virtual slot. In addition, information regarding all the cards in a stack can be provided to a processor or other logic device to assist in resource allocation or association. In some embodiments, relative address generation of stacked cards occurs on power-on, and need not involve firmware overhead for derivation of the addresses. Cards may be stacked in any desired order without the need for manual settings. Daughter cards may also use a similar address derivation algorithm.

FIG. 1 is a block diagram of a system 100 with cascaded or stacked add on cards. A host 110, such as a processor or microprocessor may be coupled to communication lines, such as a bus 115 in one embodiment. The term host, is meant to cover more than just processors and microprocessors. It may be any type of logic element as desired. In one embodiment, the cards are stacked in a manner similar to that specified in PC104 or PC104 plus computer industry standards available from PC 104 Consortium, currently located at 505 Beach Street, Suite 130 San Francisco, Calif. 94133, US, having an Internet website at: http://www.pc104.org/consortium. Other types of busses and hosts may be used in further embodiments. Host 110 in one embodiment resides on a base board 112, sometimes referred to as a mother board, as does the bus 115. A plurality of stacked add on cards, 120, 125, and 130 are coupled to the base board 112 as well as the bus 115. Three add on cards is used as an example. There may be more than three in further embodiments. The bus 115 is propagated by the stacked cards as shown at 135, 136 such that the stacked add on cards each share a same physical slot in the bus 115.

In one embodiment, the top most stacked card 130 provides a termination of the physical transmission line. In the case of cascaded modules, the termination is provided on the outermost module. In one embodiment, a dedicated add on termination card may be used as the last card in the stack. Address generation techniques may be implemented even with out termination)

Figure 2:
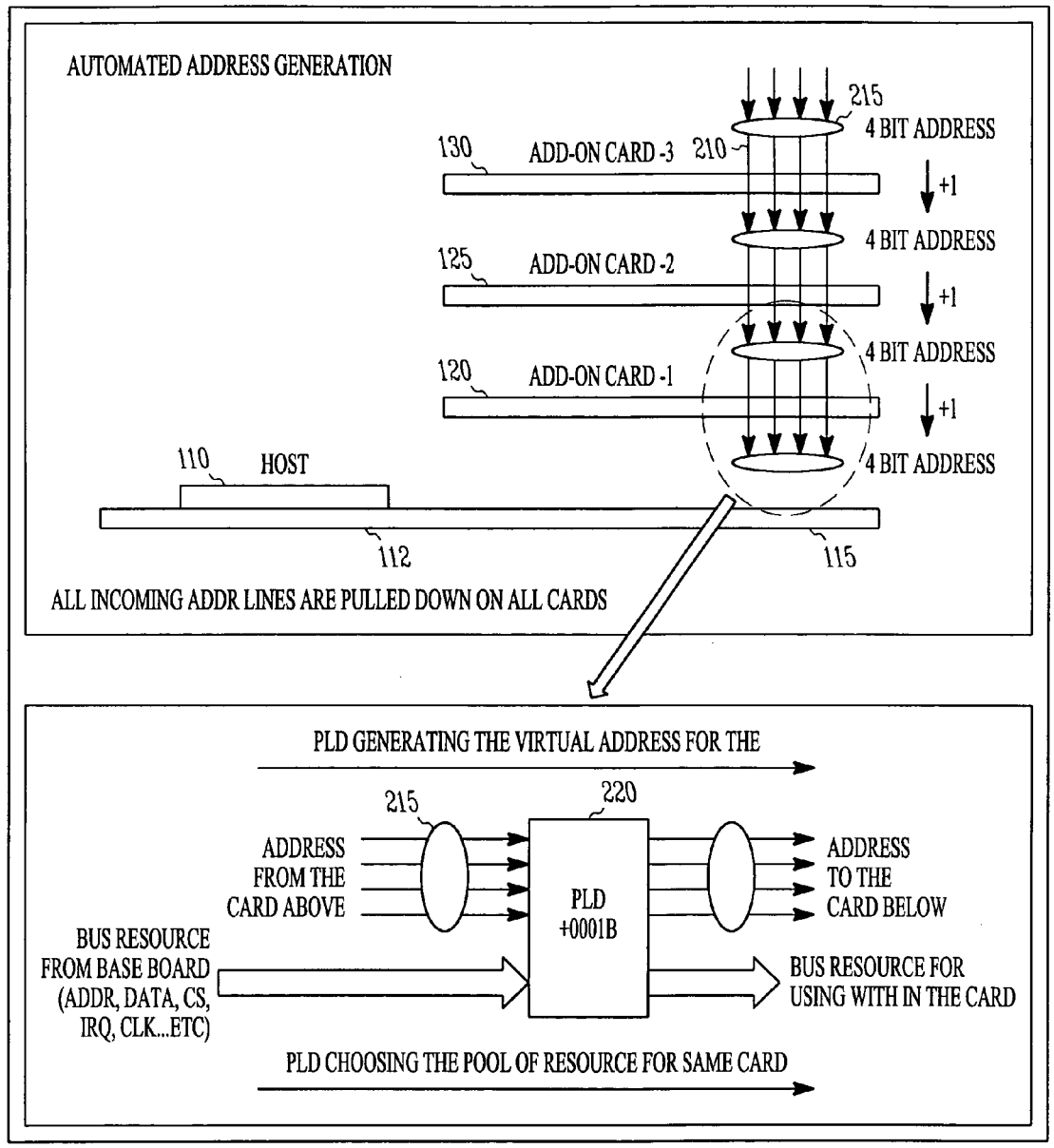
FIG. 2 is a block diagram of the system of FIG. 1 showing card virtual address generation according to an example embodiment.

Each card in the stack passes through the bus to cards further up the stack. In addition to the bus, a set of address pins 210 are provided that couple adjacent cards in the stack, as shown in FIG. 2. In one embodiment, four input and output address pins are used to provide a parallel four bit address 215 that may be passed from card to card in the stack. A different number of pins, or even a serial address line may be used. The address pins carry logic levels which are driven by one card to the next card. In one embodiment, logic in each card, represented as programmable logic device (PLD) 220 is coupled to the pins on each card, and receives an address from the device adjacent to it that is higher or above it in the stack. The logic implementation can be done by other means also, such as by dedicated devices etc.

In one embodiment the PLD or other suitable logic, increments the address by adding binary "0001" or otherwise changes the address, and passes that changed address on to the next card. In further embodiments, the address may be changed by any increment/decrement operations of any step or even by a number derived by functions using multiplication/division or further mathematical or table look-up operations. A top most or bottom most card in the stack starts the process by passing a beginning address, which may be "0000" or "0001" or other default value as desired. The default value may be generated by many different means. One example is the use of pull-up or pull-down resistors, or combinations of such resistors connected to input address lines. This default address may be overridden for all cards except the reference card by a neighboring card.

In one embodiment, each device stores the address passed to it, or in the case of the reference card, storing the originally generated address. The address may be stored or may be dynamically used in further embodiments. Such address becomes a virtual address of the card in the stack. In further embodiments, the incremented address may be used, so long as each card obtains a unique address relative to the other cards in the stack. By using a known algorithm for changing the address, each card will also know its relative position within the stack. Further, the host 110 will also know how many cards are in the stack by the last address passed by the lowest card to the bus. The PLD or other logic may then obtain or associate resources for each of the cards, such as chip select, IRQ, clock pin, etc. In further embodiments, other logic in the cards, or host, or anywhere desired may allocate the resources to each of the cards as a function of the virtual address of each card and available system resources. The PLD or other logic may act as a multiplexer/demultiplexer for the hardware resources, which may be board centric.

In one embodiment, the PLD or other logic may detect the top most card, address "0000", or other desired address, in the stack and automatically enable the termination of the card. A state of the input address lines will be decided based on pull ups/pull downs in the case of reference card. In the case of an intermediate card the state will be driven by its neighboring card which can override the default state set by the pull ups/pull downs. The method of assigning resources may operate without regard to which card is the top most card, also referred to as being in the last virtual slot. This eliminates the need for a separate termination board or manually enabling the termination.

In such embodiment, all cards may be provided with bus termination circuitry which is enabled or disabled according to the card's position in the stack. The PLD or other logic may be used to automatically enable the termination on the last card where the relative address is detected as 0x0000 or another desired address. Other cards in the stack then deactivate or do not enable termination. Controlling the termination may be done through FET or other switch control circuitry or through tri state buffers in the PLD. Other methods may also be used to control the termination.

Figure 3:
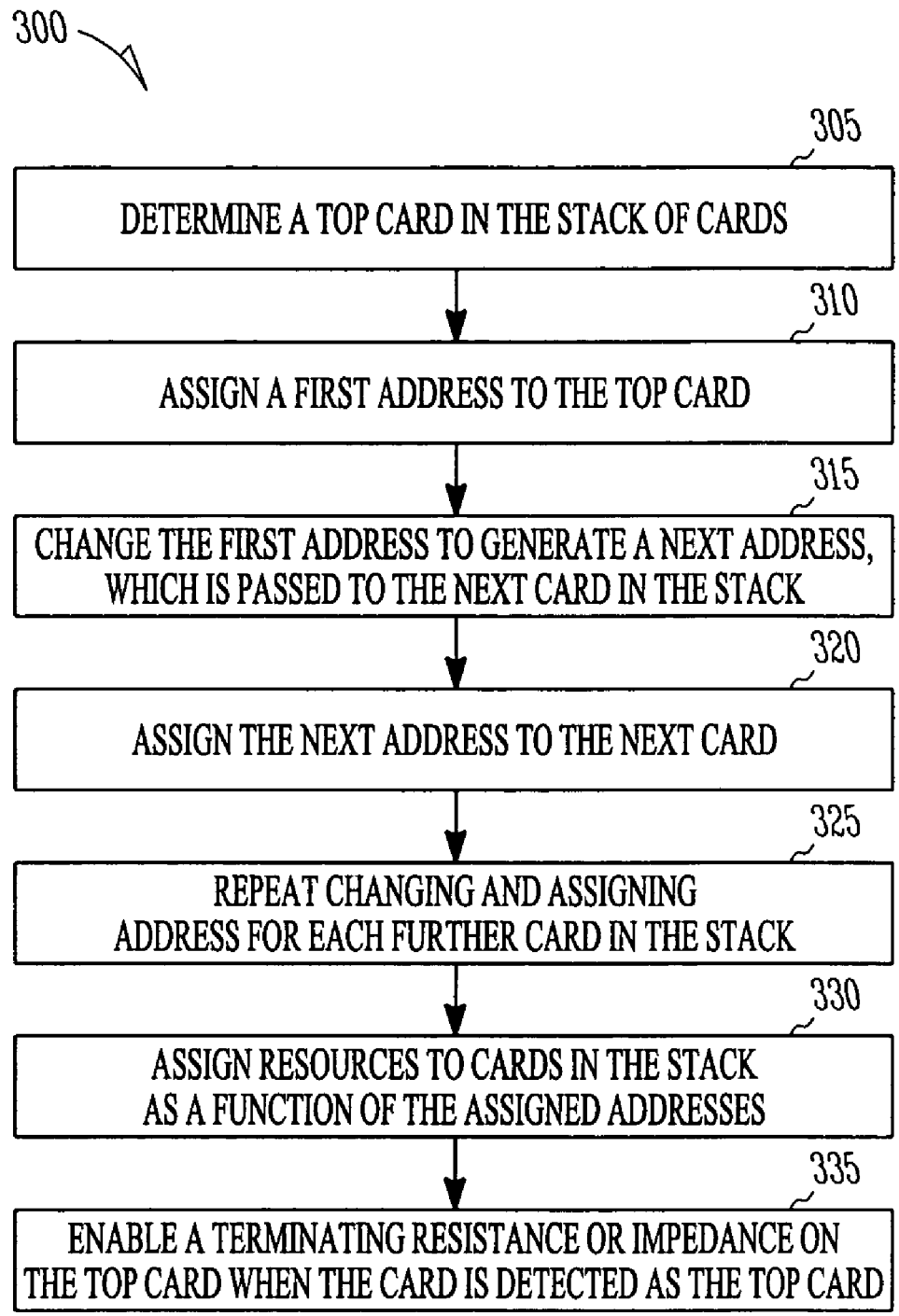
FIG. 3 is a flow chart illustrating address generation for cards stacked on a slot according to an example embodiment.

FIG. 3 is a flowchart illustrating an example method 300 of assigning virtual addresses to cards in a stack of cards. The cards may be stacked on a physical slot of a bus such that each card appears in a logical slot of the bus. The method includes determining a top card in the stack of cards at 305. A first address is assigned to the top card at 310. The first address is then changed at 310 to generate a next address, which is passed to the next card in the stack at 315. The next address is then assigned at 320 to such next card. The process is repeated for each further card in the stack as indicated at 325. The method may be implemented in logic on each card. The method is also applicable to the use of other logic devices other than a PLD. Different algorithms for modifying the address other than addition may also be used.

Resources may then be assigned to cards in the stack as a function of the assigned addresses as indicated at 330. In one embodiment, at least some of the resources are selected from the group consisting of memory, communication channels, clock, interrupts, chip selects, resets, control lines, power controls, analog inputs, digital inputs, power tracks and general purpose I/Os or any other type of electrical/electronic resources. The first address, that of the reference card may be predetermined by pull down or pull up resistors or other means as desired.

In one embodiment, the address is changed by adding 1. The address may be four bit address that is a logical address that identifies the relative position of the card.

In further embodiments, a terminating resistance or impedance may be enabled on the top card when the card is detected as the top card as indicated at 335. The method may be executed when power is applied to the cards or as otherwise desired, such as when a new card is added to the stack of cards. In one embodiment, the cards may be added when power is on, and is referred to as hot plugging.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A system for automated hardware resource allocation in a hardware device comprising:
 a baseboard having electronic communication with a plurality of daughterboards wherein said electronic communication is channeled through a route running across said daughterboards, the plurality of daughterboards including a reference card having a predetermined address;
 means for identifying relative logical address of each of said daughterboards, the relative logical address determined based on the predetermined address; and
 means for associating resources to each of said daughterboards as a function of the logical address; and
 wherein each of said daughter boards includes logic and includes termination circuitry, the logic on a particular daughterboard configured to activate the termination circuitry of the particular daughterboard upon determining that the particular daughterboard is the reference card and configured to deactivate the termination circuitry upon determining that the particular daughterboard is not the reference card.

2. The system of claim 1, wherein said route comprises a shared hardware resource generated from the baseboard and distributed across the daughterboards.

3. The system of claim 1, wherein said resources comprises at least one of memory address, interrupts, clock, I/O ports, reset, power control, or electrical interfaces or combination thereof.

4. The system of claim 1, wherein said association of resources is negotiated by at least one of the baseboard or by the daughterboards or self-association of resources by the daughterboards.

5. The system of claim 1, wherein identification of said logical address is achieved by a programmable logic device.

6. The system of claim 1, wherein identification of said logical address is achieved by discrete hardware adapted to execute the identification.

7. The system of claim 1, wherein the daughterboards are homogeneous.

8. The system of claim 1, wherein the daughterboards are heterogeneous.

9. The system of claim 1, wherein said hardware device is selected from the group consisting of an embedded device, non-embedded device, multi processor device or combination thereof.

10. A card for coupling to a physical slot of a base board in a stacked relationship with other cards including a reference card, the reference card having a predetermined address, the card comprising:
   connectors for connecting to the slot of the base board and to other cards in a stack of cards; and
   a first module that identifies a position with respect to other cards stacked on the slot, assigns a logical address representative of the relative position of the card with respect to the reference card, and passes a changed address on to a next card in the stack of cards; and
   logic configured to determine if the card is located in a reference card position; and termination configured to operate in an enabled mode in which the predetermined address is active and configured to operate in a disabled mode in which the predetermined address is inactive, the mode determined by the logic.

11. The card of claim 10 wherein at least some of the connectors are inter card connectors.

12. The card of claim 11 wherein the first module determines if the card is on top of the stack.

13. The card of claim 12 wherein the first module receives an address from a card above it in the stack and modifies that address.

14. The card of claim 13 wherein the first module passes the modified address on to an adjacent card lower in the stack of cards.

15. The card of claim 13 wherein the address and modified address are virtual addresses identifying relative positions of the cards in the stack of cards.

16. The card of claim 10 and further comprising a second module that identifies resources for the card as a function of its identified position in the stack, wherein some of the resources are selected from the group consisting of memory, communication channels, clock, interrupts, chip selects, resets, control lines, power controls and general purpose I/Os.

17. The card of claim 10 wherein the termination includes impedance.

18. A method of configuring cards stacked on a physical slot of a bus such that each card appears in a logical slot of the bus, the method comprising:
   determining a top card in the stack of cards, the stack including the top card and other cards; enabling a termination of the top card and disabling a termination of the other cards in the stack, wherein enabling includes;
   assigning a first address to the top card;
   changing the first address to a next address for the next card;
   passing the next address to a next card in the stack;
   assigning the next address to such next card of the other cards; and
   repeating passing, assigning and changing the address for each further card in the stack.

19. The method of claim 18 wherein the method is implemented in logic on each card.

20. The method of claim 18 wherein at least some of the resources are selected from the group consisting of memory, communication channels, clock, interrupts, chip selects, resets, control lines, power controls and general purpose I/Os.

21. The method of claim 18 and further comprising assigning resources to cards as a function of the assigned addresses.

22. The method of claim 18 wherein the first address is predetermined by pull down or pull up resistors.

23. The method of claim 18 wherein the address is changed by adding 1.

24. The method of claim 18 wherein each address is a four bit address.

25. The method of claim 24 wherein the four bit address is a logical address that identifies the relative position of the card.

26. The method of claim 18 wherein the method is executed dynamically while power is applied to the cards.

27. A system comprising:
   a baseboard having a connector and a plurality of resources; and
   a plurality of cards including a first card physically coupled to the connector and including a top card, each card of the plurality of cards in stacked alignment and each card including termination and including logic, wherein the logic of a particular card is configured to enable the corresponding termination if the particular card is the top card and the logic of the particular card is configured to disable the corresponding termination if the particular card is not the top card, and wherein a predetermined address of the top card is activated when the corresponding termination is enabled, the predetermined address of the top card configured to provide a reference address and wherein an address of each of the remaining cards in the plurality of cards is determined based on position in the stacked alignment relative to the top card.

28. The system of claim 27 wherein the logic includes a programmable logic device.

29. The system of claim 27 wherein the termination includes at least one of a resistor, an impedance, a FET, a switch control circuit, or a tri state buffer.

* * * * *